Sept. 20, 1932.   L. L. DOLLINGER   1,878,681
PIPE LINE FILTER
Filed Sept. 30, 1929
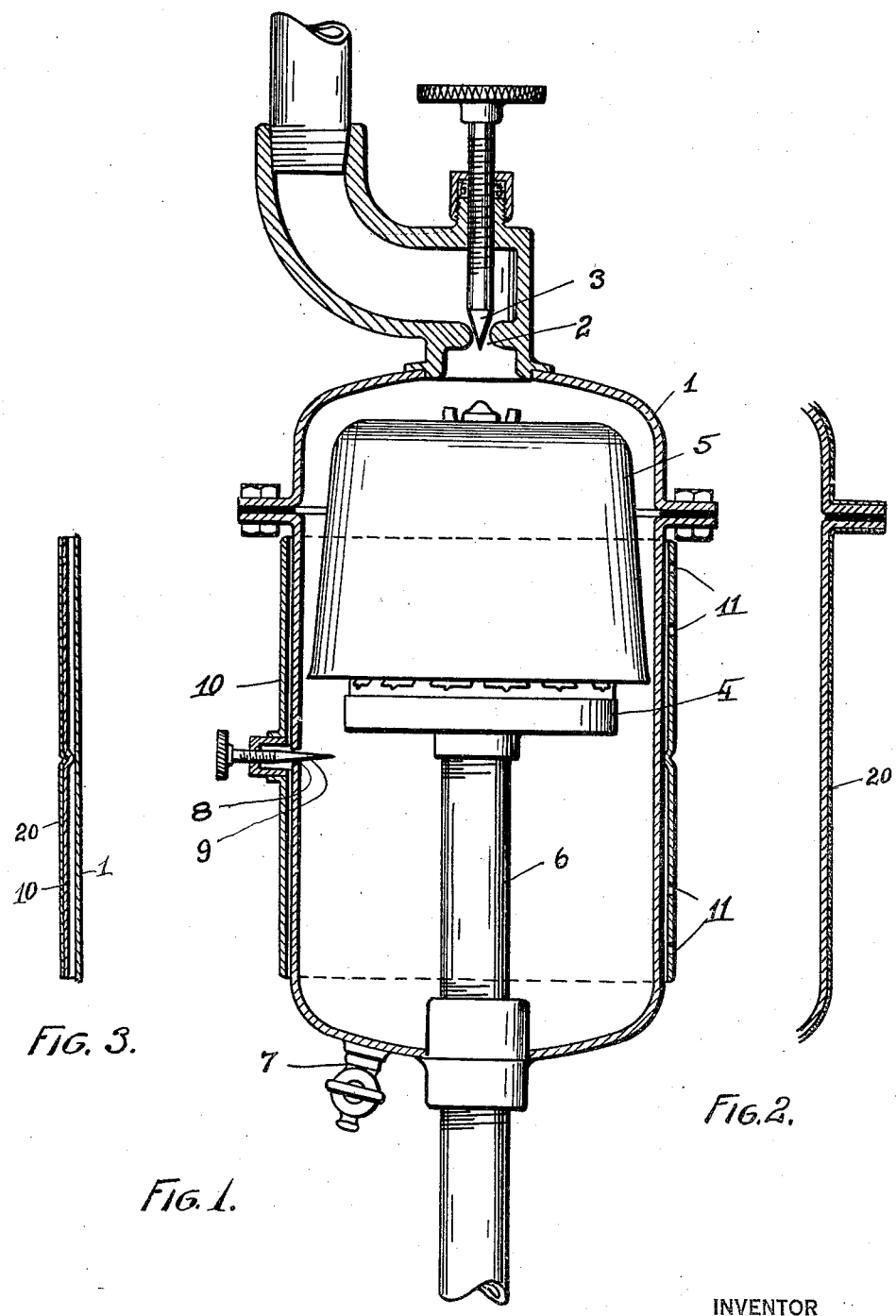

Patented Sept. 20, 1932

1,878,681

UNITED STATES PATENT OFFICE

LEWIS L. DOLLINGER, OF ROCHESTER, NEW YORK

PIPE LINE FILTER

Application filed September 30, 1929. Serial No. 396,232.

This invention relates to pipe line filters especially for use in compressed air lines and has for its various objects:

To provide means whereby the temperature of the air is automatically lowered in entering the filter in order to condense the moisture in the air within the filter housing.

To provide means whereby the temperature of the filter housing is lowered in order to condense the moisture in the air within the filter housing and before it leaves the housing.

These and other objects of this invention will be apparent from the drawing, the specification and the appended claims forming a part thereof.

In the accompanying drawing:

Figure 1 illustrates a vertical sectional view of a pipe line filter embodying the cooling means for condensing the moisture of the air passing through the filter.

Figure 2 is a detail sectional view of a portion of the filter housing surrounded with a heat insulating coating.

Figure 3 is a sectional view of a portion of the filter housing and the jacket surrounding it, the shell being provided with a heat insulating coating.

The subject matter of this invention is an improvement of the pipe line filter illustrated in my prior application, Serial No. 277,927 which has eventuated into Patent No. 1,830,075, dated Nov. 3, 1931. This improvement consists of means that are incorporated in the pipe line filter whereby the moisture in the air passing through the filter is automatically condensed in the filter housing and trapped therein to prevent this moisture from passing on to the spray gun or other tool that is to be operated by the air. When moisture is present in the air that is fed to a spray gun, it affects the finish of the coating produced by the spray gun, and when moisture enters air operated tools, such as air hammers, drills, etc., it reduces their operating efficiency. Filters and traps have heretofore been employed for the purpose of taking out the moisture in the air lines but such devices have not entirely prevented moisture carried in the air from reaching the air operated tools. In my present invention I have supplemented a filter with automatic cooling means whereby practically all of the moisture in the air is condensed as it passes through the filter housing and is trapped therein so that none of it can leave the filter to pass on to the air operated tools.

As illustrated in the figure of the drawing, the cooling of the interior of the filter housing 1 is secured by allowing the air and moisture to rapidly expand into the housing. For this purpose a valve is placed at the inlet of the filter housing. This valve comprises a Venturi duct 2 into which projects the needle valve 3. The opening of the Venturi duct may thus be enlarged or reduced to control the air entering the filter housing.

In the filter housing is located the filter 4 over which is placed the deflector cup 5. The filter is mounted on top of the outlet pipe 6 which terminates in the outlet in the bottom of the filter housing from which the air line leads to the air operated tool. In the bottom of the filter housing is also provided the drain cock 7 by means of which the condensed moisture from the air may be drained from the filter housing.

The cooling of the filter housing is secured by the rapid expansion of the air and moisture as it enters the filter housing. For this reason the inlet through the Venturi duct has a very small diameter so that the air and moisture as it enters into the filter housing must expand rapidly in order to fill the increased volumetric space of the filter housing. The expansion of the air and moisture as it enters the filter housing lowers the temperature of the air and moisture and in turn cools the filter housing so that the moisture in the air is condensed in the filter housing and collects in the bottom of it from where it may be drained at suitable intervals by means of the drain cock 7.

The opening of the Venturi intake duct may be increased or decreased by means of the needle valve 3 and by regulating this opening, the expansion of the air and moisture and the consequent condensation of the moisture in the air may be regulated so that the air after leaving the filter will be practically free from moisture.

Further condensation of the moisture in the air is secured in the filter housing by permitting a small amount of the air and moisture to expand into the atmosphere and thus cool the housing still further. For this purpose a small opening 8 is provided in the side wall of the filter housing which opening is controlled by a needle valve 9. Surrounding the filter housing or shell 1 is a jacket 10 which is suitably spaced from the housing so as to leave a narrow space between it and the housing. The needle valve 9 is supported in the jacket so that in opening this valve air from the filter housing is allowed to escape into the space formed between the filter housing and the jacket. The air thus allowed to escape into the atmosphere expands rapidly causing the temperature thereof to drop. Cooled air is thus admitted into the space between the jacket and the filter housing and is distributed over the area of the filter housing which is surrounded by the jacket. The air and moisture are allowed to escape from between the jacket and the filter housing through suitable holes and from the top and bottom of the jacket which are preferably left open.

The amount of air and moisture that is allowed to escape from the filter housing may be regulated by the needle valve in order to secure the proper temperature for the filter housing without too much loss of air.

In Figure 2 I have illustrated a slight modification of the pipe line filter. This modification consists in surrounding the filter housing with a heat insulating coating 20 which serves to prevent the absorption of the heat of the surrounding atmosphere by the filter housing after the temperature within it has been lowered as above described. The insulating coating is shown applied to the outside of the housing but it is understood that it can be applied to the inside of the housing instead.

The modification illustrated in Figure 3 shows that the heat insulating coating 20 may be placed around the jacket surrounding the filter housing so that the heat of the surrounding atmosphere cannot materially increase the low temperature created between the jacket and the filter housing.

I claim:

1. In a pipe line filter having a filter and a filter housing surrounding the filter, the combination of a jacket surrounding said filter housing with a space between said jacket and said filter housing, and means for allowing air and moisture from said filter housing to expand into said jacket to cause a drop in the temperature of the air and moisture entering said jacket so as to cool the outside of said jacket and cause the condensation of the moisture in the air passing through said filter housing.

2. In a pipe line filter the combination of a filter housing having an opening therein, a valve for controlling the opening in said housing, and means surrounding said filter housing to allow air and moisture from said opening to expand therein to cause a drop in temperature of the air and moisture and in turn cool said filter housing.

3. A trap for separating moisture from compressed air comprising a housing having an opening therein, a jacket surrounding said housing, means controlling the escape of the air and moisture thru the hole in said housing to permit a rapid expansion of the air and moisture into the space between said jacket and said housing to cause a drop of the temperature of the air and cool said filter housing and a heat insulating coating on said jacket.

4. A trap for separating moisture from compressed air comprising a housing having an opening therein, a jacket surrounding said housing, means controlling the escape of the air and moisture thru the hole in said housing to permit a rapid expansion of the air and moisture into the space between said jacket and said housing to cause a drop of the temperature of the air and cool said filter housing.

LEWIS L. DOLLINGER.